March 17, 1925. 1,530,032
H. A. BUBB ET AL
GEAR SHIFT
Filed April 28, 1924
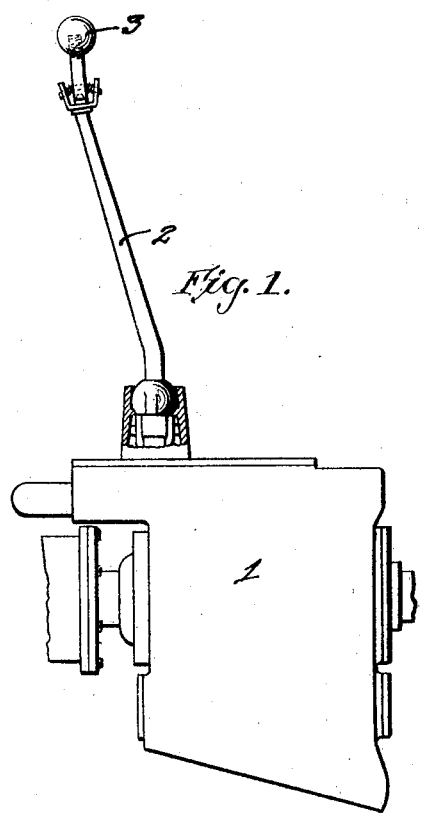
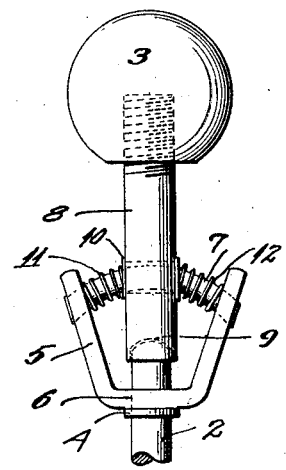
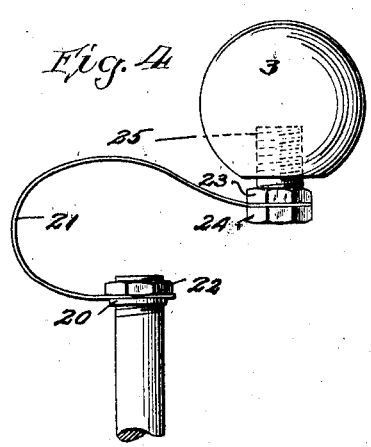
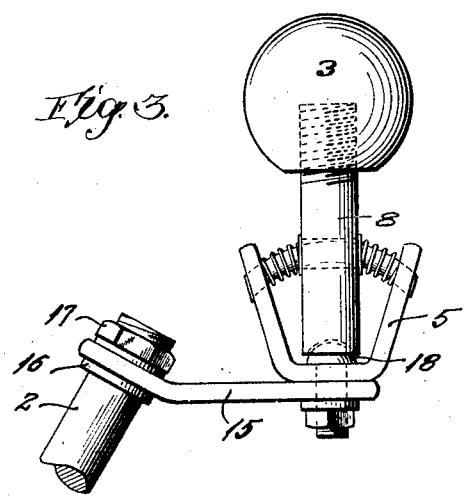
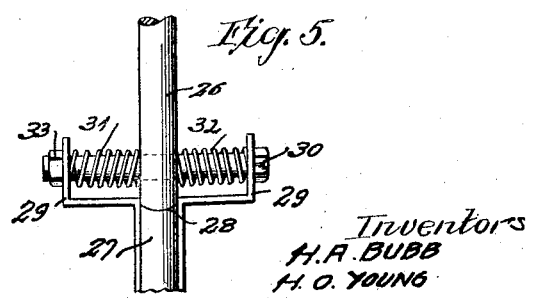
Inventors
H. A. BUBB
H. O. YOUNG Patented Mar. 17, 1925.

1,530,032

UNITED STATES PATENT OFFICE.

HARRY A. BUBB AND HUGH O. YOUNG, OF MONROE, LOUISIANA.

GEAR SHIFT.

Application filed April 28, 1924. Serial No. 709,461.

*To all whom it may concern:*

Be it known that we, HARRY A. BUBB and HUGH O. YOUNG, citizens of the United States of America, residing at Monroe, in the parish of Ouachita and State of Louisiana, have invented certain new and useful Improvements in Gear Shifts, of which the following is a specification.

Our invention relates to improvements in gear shifting levers, and is more particularly directed to that type adapted for use with the standard type of sliding gear transmission usually employed in motor driven vehicles.

Heretofore, in the operation of this type of lever it frequently happens that during the act of changing from one gear to another, the gears slash prior to their positive engagement and by reason of the fact that pressure is being exerted upon the lever by the operator it follows that the gears become worn and broken to such a degree that new ones are necessary.

It is therefore, the object of our invention to provide a lever of the type referred to which will eliminate any wear upon the gears of the transmission in the event a clash takes place prior to their positive engagement.

A further object of our invention is to provide a lever which is resilient to such a degree that when pressure is applied thereto by the operator it will not cause any material wear upon the gears in the event the gears clash prior to their engagement.

Still another object of our invention is to provide an attachment for levers of the usual type that will eliminate any wear upon the gears when in the act of changing from one to the other.

Another object of our invention is to provide an attachment for levers of the class referred to which will not only eliminate wear upon the gears of the transmission during the shifting action but will serve as a cushion to prevent any shocks that take place during the movement of the lever from being transmitted to the hand of the operator.

Various other objects and advantages will be more fully apparent from the following description of the accompanying drawings, which forms a part of this disclosure and which illustrates various embodiments of our invention.

In the accompanying drawings:—

Figure 1 is a side elevation of a transmission gear box, the same having the usual hand lever to which our invention is applied.

Figure 2 is an enlarged view illustrating our invention as shown in Figure 1.

Figure 3 is a modified form of our invention disclosing a bracket element used to connect the same to the gear lever.

Figure 4 is another modified form disclosing the mere use of a leaf spring positioned between the main portion of the lever and the handle portion, and Figure 5 is a further modified form showing the main lever divided and our invention applied to the adjacent end portions of the sections.

Referring to the accompanying drawings in detail, wherein like reference characters denote corresponding parts throughout the several views, the numeral 1 indicates the usual transmission gear box of the type generally used in motor driven vehicles, the same being provided with a hand lever 2 through the medium of which the gears are changed at the will of the operator. It is to the upper end of this lever that we apply our improvement, it being of course understood that the forms disclosed in the drawings being the preferred embodiments of our invention. If desired our invention may be applied at either end of the hand lever and at any of its intermediate points.

Referring to Figures 1 and 2, it will be noted that the usual knob 3, which is screwed upon the end of the lever 2, is removed and upon the threaded end of the lever 2 we have applied a lock washer 4 which forms a support for the base of a substantially U-shaped member 5. Referring to the drawings it will be noted that the base of the member 5 is provided with an opening 6 which receives therethrough the end of the lever 2, thus permitting the member 5 to rest upon the washer 4. The adjacent end portions of the legs of the member 5 are connected by a curved rod 7, upon which is freely slidable a rod 8, the lower end portion of which is provided with a suitable socket 9 to receive therein the end portion of the lever 2, while its upper end is threaded to receive thereon the usual knob 3. The opening provided within the rod 8, through which the curved rod 7 passes, has fitted therein a suitable wear bushing 10, the end portions of which are flared outward and receive thereagainst the end portions of springs 11 and 12 which are coiled about the rod 7 and adapted to hold the rod 8 in alignment with the usual lever 2.

By this arrangement it will be apparent that when the operator grasps the knob 3 to shift the gears of the transmission the rod 8 and the lever 2 will move substantially in alignment, but in the event the gears engage or clash any pressure that is exerted upon the knob 3 will be taken care of by the spring 11 or 12 and not transmitted into the gear box, thus eliminating any wear upon the gears. Furthermore any shocks that take place within the gear box will be absorbed by the springs and not transmitted to the hand of the operator.

It is of course to be understood that the tension of each spring is just sufficient to permit the movement of the lever to shift the gears properly, but in the event a clash of the gears take place the springs are then caused to function.

In Figure 3 we have illustrated a modified form of our invention wherein it is desired to bring the operating handle nearer the operator, or in certain types of cars wherein it would be impossible to use the form illustrated in Figures 1 and 2. In this form we have removed the usual knob 3 and applied to the threaded end of the lever 2, an arm 15 which is supported upon a washer 16 and locked thereagainst by a suitable locking nut 17. The free end of the arm 15 is provided with an opening through which a round headed bolt 18 passes and secures thereto the member 5, as disclosed in Figure 2. In this form the lower end portion of the rod 8 receives therein the head of the bolt 18. The operation of this form is the same as that of Figure 2.

In Figure 4, we have illustrated a form somewhat different in structure to those previously referred to but wherein the operation and result accomplished is the same. In this form we remove from the lever 2 the usual knob 3 and apply upon its threaded end a washer 20 upon which one end portion of a substantially U-shaped leaf spring 21 rests and being secured thereto by a suitable lock nut 22. The other end of the spring 21 has secured thereto by nuts 23 and 24 a threaded stud 25 which receives thereon the knob 3. The spring in this form is likewise of a tension sufficient to move the knob and lever 2 in unison and eliminate any pressure from being transmitted from the hand of the operator to the gears within the gear box, in the event a clashing of the gears takes place.

In Figure 5 we have illustrated a form somewhat similar to that shown in Figures 1 and 2 but in this form the lever 2 is divided and our invention applied between the sections. In this form we have shown the lever 2 as being composed of two parts 26 and 27, the lower section having a socket 28 to receive therein the rounded end portion of the upper section. The section 27 has secured thereto oppositely arranged members 29 the end portions of which are connected by a rod 30 which passes through the upper section 26 and has coiled thereabout springs 31 and 32, the rod 30 being in the form of a bolt and secured in place by a nut 33. The upper end of the section 26 will have carried thereby the usual knob 3. The operation of this form is the same as that of Figure 2.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

Having thus fully described our invention, what we claim as new and desire to secure my Letters Patent, is:—

1. An attachment for levers of the class described composed of a bracket secured to said lever, a hand rod carried by said bracket and yieldably connected to said lever, and said connection permitting the movement of both lever and rod in unison during the unrestricted period of the former.

2. A lever of the class described having detachably secured thereto a bracket, a rod carried by said bracket and engaging said lever, said rod having a hand operating portion, and resilient means interposed between said rod and bracket to permit certain movement of one with respect to the other.

3. A lever of the class described having detachably connected thereto a bracket, a rod carried by said bracket and pivoted upon said lever, and resilient means interposed between said rod and bracket to permit certain movement of said rod with respect to said lever.

HARRY A. BUBB.
HUGH O. YOUNG.

Witnesses:
IRENE HICKERSON,
J. B. LAMPKIN.